(12) United States Patent
Wessling

(10) Patent No.: US 7,683,124 B2
(45) Date of Patent: Mar. 23, 2010

(54) DISPERSIONS OF INTRINSICALLY CONDUCTIVE POLYMERS, AND METHODS FOR THE PRODUCTION THEREOF

(75) Inventor: Bernhard Wessling, Bargteheide (DE)

(73) Assignee: Ormecon GmbH, Ammersbek (DE)

( * ) Notice: Subject to any disclaimer, the term of this patent is extended or adjusted under 35 U.S.C. 154(b) by 726 days.

(21) Appl. No.: 10/597,170

(22) PCT Filed: Jan. 21, 2005

(86) PCT No.: PCT/EP2005/000595

§ 371 (c)(1),
(2), (4) Date: Jan. 2, 2007

(87) PCT Pub. No.: WO2005/070972

PCT Pub. Date: Aug. 4, 2005

(65) Prior Publication Data

US 2007/0267747 A1   Nov. 22, 2007

(30) Foreign Application Priority Data

Jan. 23, 2004  (DE) .................. 10 2004 003 784

(51) Int. Cl.
  *C08F 2/16* (2006.01)
(52) U.S. Cl. ..................................... 524/800
(58) Field of Classification Search .............. 524/800
  See application file for complete search history.

(56) References Cited

U.S. PATENT DOCUMENTS

| 4,394,498 | A | 7/1983 | Kastelic |
| 4,585,695 | A | 4/1986 | Ogasawara et al. |
| 5,104,599 | A | 4/1992 | Prevorsek et al. |
| 5,403,913 | A | 4/1995 | MacDiarmid et al. |
| 5,498,761 | A | 3/1996 | Wessling et al. |
| 5,567,355 | A | 10/1996 | Wessling et al. |
| 5,720,903 | A | 2/1998 | Wessling et al. |
| 2007/0142595 | A1 | 6/2007 | Hashiba et al. |
| 2008/0265215 | A1 | 10/2008 | Wessling |

FOREIGN PATENT DOCUMENTS

| CA | 2553467 | 8/2005 |
| DE | 37 29 566 | 3/1989 |
| DE | 4317010 | 11/1994 |
| DE | 102004003784 | 8/2005 |
| EP | 0329768 | 8/1989 |
| EP | 0446943 | 9/1991 |
| EP | 0329768 | 11/1996 |
| EP | 1061530 | 12/2000 |
| EP | 1 595 908 | 11/2005 |
| JP | 2003-277417 | 10/2003 |
| WO | WO 94/27297 | 11/1994 |
| WO | WO 2004/083283 | 9/2004 |
| WO | WO 2005/070972 | 8/2005 |

OTHER PUBLICATIONS

Adams et al. (1998) J. Phys. Condens. Matter 10:8293-8303, "A new acid-processing route to polyaniline films which exhibit metallic conductivity and electrical transport strongly dependent upon intrachain molecular dynamics".
Adams et al. (1999) Synthetic Metals 101:685-685, Paper No. 6074, "Temperature dependent conductivity behaviour of polyaniline fibres".
Armes P et al (1987) Journal of the Chemical Society, Chemical Communications, pp. 288-290, "Dispersions of electrically Conducting Polypyrrole particles in aqueous media".
Dufour et al. (2003) Synthetic Metals 135-136:63-68, "The role of chain and dopant engineering in the preparation of processible conducting polymers with desired properties".
Gabrielson, L. and Folkes, J. (Jan. 2001) Journal of Materials Science, vol. 36, No. 1, pp. 1-6, "Manufacture of colloidal polymer ellipsoids for anisotropic conducting nano-composites".
Gospodinova N et al (Feb. 1997), Polymer, vol. 38, No. 3, pp. 743-746, "A new route to polyaniline composites".
Holland et al. (1996) J. Phys. Condens. Matter 8:2991-3002, "Conductivity studies of polyaniline doped with CSA".
Keville, K.M. et al. (Jun. 1991) Journal of Colloid and Interface Science, vol. 144, No. 1, pp. 103-126, "Preparation and Characterization of Monodisperse Polymer Microspheroids".
Kim, D. et al. (May 24, 2002), Macromolecules, vol. 35, pp. 5314-5316, "Size Control of Polyaniline Nanoparticle by Polymer Surfactant".
Kosina, S. et al. (1994) Journal of Materials Science, vol. 29, pp. 3403-3407, "Study on the electrical conductivity and morphology of porous polypyrrole layers prepared electrochemically in the presence of pyridinium chlorochromate".
Macdiarmid et al. (Aug. 1994) Synthetic Metals 65(2-3):103-116, "The concept of secondary doping as applied to polyaniline".
Mattes et al. (1997) Synthetic Metals 84:45-49, "Formation of conductive polyaniline fibers derived from highly concentrated emeraldine base solution".
Naarmann et al. (1987) Synthetic Metals 22:1-8, "New Process for the Production of Metal-Like, Stable Polyacetylene".
Pomfret et al. (2000) Polymer 41:2265-2269, "Electrical and mechanical properties of polyaniline fibres produced by a one-step wet spinning process".
Wessling et al. (2000) Eur. Phys. J. E 2:207-210, "Dispersion-induced insulator-to-metal transition in polyaniline".
Zhou et al. (2001) J. Matr. Sci. 36(13):3089-3095, "Electrically conductive PANi multifilaments spun by a wet-spinning process".
Office Action dated Feb. 13, 2009 for related U.S. Appl. No. 11/817,539.

*Primary Examiner*—Edward J Cain
(74) *Attorney, Agent, or Firm*—Swanson & Bratschun, L.L.C.

(57) ABSTRACT

The invention relates to a dispersion which contains particles of at least one intrinsically conductive polymer, wherein the particle size is on average (weight) less than 1 μm, and which is characterized in that the dispersant is a liquid at room temperature, and a layer, film or sheet formed from this dispersion has a conductivity of >100 S/cm after removal of the dispersant. The invention also relates to a process for the preparation of this dispersion.

16 Claims, No Drawings ered by the dispersion process, without the chemical composition of the conductive polymer used being substantially changed.

The state of the art contains numerous efforts to clearly increase conductivity. Whereas a conductivity range of around and less than 5 S/cm is normally achieved after synthesis, values of 10 s, sometimes also 100 s, of S/cm are achieved using different procedures. Conductivity values of 1,000 s or 10,000 s of S/cm, as achieved by Naarmann and Theophilou in Synthet. Met., 22, 1 (1987) 15 years ago with polyacetylene using a special polymerization process followed by stretching, have not proved achievable to date with other conductive polymer systems. However, the process used by Naarmann et al. has the disadvantage that it is difficult to carry out and difficult to reproduce. Moreover, it leads to a product which is not air- or oxidation-resistant and moreover cannot be further processed.

Apart from the above-mentioned one-stage process of EP-A-0 700 573, the processes of the state of the art are characterized in that selected dopants or selected combinations of dopants are used, often followed by a stretching of the obtained product. Synthetic Metal (Special Issue, Vol. 65, Nos. 2-3, August 1994) and also the contributions by Epstein et al. and Heeger et al. (Handbook of Conductive Polymers, Skotheim, Eisenbanner, Reynolds (Publ.), M. Dekker, N.Y. 1998) give a good overview of these processes.

FIG. 3.2 in Kohlman and Epstein in the above-named handbook gives a very good overview of the achieved conductivity values to date, wherein the higher values around $10^2$ S/cm are generally achieved only after stretching a film or fibre prepared from the intrinsically conductive polymer.

The procedure in the case of polyaniline is e.g. that aniline is polymerized in aqueous hydrochloric acid, whereupon the chloride salt of the protonated polyaniline forms. This is neutralized by means of a strong base, e.g. ammonia, to remove HCl. As a result, the so-called emeraldine base is obtained. This is dissolved with camphorsulphonic acid in the presence of the toxic m-cresol in xylene or chloroform. A film is cast from this solution and then stretched. After stretching, a conductivity of $10^2$ s of S/cm is achieved.

This process, called secondary doping, see Mac Diarid and Epstein, Synth. Met. (Special Issue) Vol. 65, Nos. 2-3, August 1994, pp. 103-116, is carried out in numerous variants, i.a. in works by Holland, Monkman et al. J. Phys. Condens. Matter 8 (1996), 2991-3002 or Dufour, Pron et al., Synth. Met. (2003), No. 133-136, pp. 63-68, wherein the acid and the secondary dopant are varied. In further variants of this process, Mattes et al., U.S. Pat. No. 6,123,883, produced fibres which likewise display a conductivity of $10^2$ s of S/cm after stretching.

The state of art discussed above shows that camphorsulphonic acid is regarded as the doping agent of choice.

Likewise it is clear that most researchers try to prepare true solutions of conductive polymers and seek to maximize crystallinity after removal of the solvent.

In view of the numerous publications, it is astonishing that no products with these conductivity properties are commercially available. This is due above all to the fact that the conductivity is not sufficiently reproducible, but also to the fact that toxic solvents or dispersants must be used and that the product must still be stretched.

However, the above-mentioned dispersion process of EP-A-0 700 573 which does not have these disadvantages has likewise not proved to be the best solution to the commercial preparation of end-products with a conductivity of clearly more than 100 S/cm. Added to this is the fact that the end-product is preferably a thermoplastic polymer blend which

DISPERSIONS OF INTRINSICALLY CONDUCTIVE POLYMERS, AND METHODS FOR THE PRODUCTION THEREOF

RELATED APPLICATIONS

This application is a 35 U.S.C. 371 national phase application of PCT/EP2005/000595 (WO 2005/070972), filed on Jan. 21, 2005, entitled "Dispersions of Intrinsically Conductive Polymers, and Methods for the Production Thereof", which claims priority to German Application Serial No. 10 2004 003 784.129, filed Jan. 23, 2004. Each of these applications is incorporated herein by reference in its entirety.

The present invention relates to a stable dispersion which contains particles of intrinsically conductive polymers, a process for the preparation of same and also their use for the preparation of mouldings, films or coatings.

Substances which are built up from low-molecular-weight compounds (monomers), are at least oligomeric through polymerization, i.e. contain at least 3 monomer units that are linked by chemical bonding, have a conjugated n-electron system in the neutral (non-conductive) state, and can be converted by oxidation, reduction or protonation (which is often called "doping") into an ionic form that is conductive are called conductive polymers, which are also called "intrinsically conductive polymers" or "organic metals". The conductivity is at least $10^{-7}$ S/cm.

Dopants used in the case of doping by oxidation are e.g. iodine, peroxides, Lewis and protonic acids or in the case of doping by reduction e.g. sodium, potassium, calcium.

Conductive polymers can have extremely different chemical compositions. For example, acetylene, benzene, napthalin, pyrrole, aniline, thiophene, phenylene sulfide, perinaphthalene and others, as well as their derivatives, such as sulphoaniline, ethylenedioxythiophene, thienothiophene and others, as well as their alkyl or alkoxy derivatives or derivatives with other side groups, such as sulphonate, phenyl and other side groups have proved themselves as monomers. Combinations of the above-named monomers can also be used as monomer. For example, aniline and phenylene sulfide are linked and these A-B dimers then used as monomers. Depending on the aim, e.g. pyrrole, thiophene or alkylthiophene, ethylenedioxythiophene, thienothiophene, aniline, phenylene sulphene and others can be bonded together to form A-B structures which are then converted to oligomers or polymers. Alternatively, two or more, e.g. three different monomers can be polymerized jointly.

Most conductive polymers display a more or less marked rise in conductivity as temperature increases, which shows them to be non-metallic conductors. A few representatives of this substance class display a metallic behaviour at least in a temperature range close to room temperature inasmuch as the conductivity falls as temperature increases. A further method of recognizing metallic behaviour consists of plotting the so-called "reduced activation energy" of conductivity against the temperature at low temperatures (down close to 0° K.). Conductors with a metallic contribution to the conductivity display a positive rise in the curve at a low temperature. Such substances are called "organic metals".

Such an organic metal has been described by Weβling et al. in Eur. Phys. J. E 2, 2000, 207-210. The transition from the state of a non-metallic to an at least partly metallic conductor was effected by a one-stage trituration or dispersion process completed once synthesis of the intrinsically conductive polymer was completed, the process-engineering basis for which is described in EP-A-0 700 573. Conductivity is also has a conductive polymer concentration of, generally, only just under 40%. Further processing into products, e.g. layers which either consist predominantly of the conductive polymer or contain any matrix in any concentration (depending on the demands made of the product to be prepared with same), is therefore not possible.

The object therefore remains to provide a process with which intrinsically conductive polymers and products containing same can be prepared in which the conductive polymer has a high conductivity ($>10^2$ S/cm) without prior stretching, and which offers an almost unlimited formulation freedom, with the result that substrates of the most varied types and forms can be coated with such a conductive polymer or products of the most varied forms and compositions can be prepared from same.

The above objects are achieved according to the invention by a stable dispersion which contains particles of at least one intrinsically conductive polymer, wherein the particle size is on average (weight) less than 1 µm, and which is characterized in that the dispersant is a liquid at room temperature, and a layer, film or sheet formed from this dispersion has a conductivity of >100 S/cm after removal of the dispersant.

A subject of the invention is furthermore a process for the preparation of the above-named dispersion, in which in this order
(a) an intrinsically conductive polymer is prepared from monomers, wherein the temperature during the polymerization is controlled such that it does not exceed a value of more than 5° C. above the starting temperature,
(b) the product from stage (a) is triturated and/or dispersed in the presence of a non-electrically conductive, non-polymeric polar substance which is inert vis-à-vis the conductive polymer, applying adequate shearing forces, wherein the weight ratio between the conductive polymer and the polar substance is 2:1 to 1:10,
(c) the product from stage (b) is dispersed in a dispersant which is liquid at room temperature, wherein the weight ratio between the conductive polymer and the dispersant is less than 1:10.

A subject of the invention is also the use of a dispersion as named above or as obtained according to the process named above, to prepare mouldings, self-supporting films or coatings with electric conductivity.

Further preferred embodiments of the present invention follow from the dependent claims.

The success achieved according to the invention is to be regarded as surprising in particular because in general a dispersion process is regarded as harmful to the conductivity of the polymer. Most experts suppose that the chains of the conductive polymers are ruptured during dispersion, with the result that the electron conduction (along these chains) is worsened. Therefore they attempt, as stated above with regard to the state of the art, to prepare true solutions of conductive polymers. In addition, the use of dispersants and additives is in general also regarded as disadvantageous, as they could increase and reinforce the barriers to the transportation of the electrons. With the process according to the invention, two dispersion steps have actually been proposed.

It is furthermore to be regarded as surprising that with the process according to the invention, after the first dispersion stage (stage (b)), a complete removal of possibly present non-conductive polymer is not essential, as is explained in more detail below.

The dispersions according to the invention furthermore have the advantage that they are stable. Stable dispersions according to the invention therefore need not be further processed immediately after their preparation or at least after a short time, but can be stored for an extended period of time, e.g. for several hours, e.g. 5-10 hours, or days, e.g. 1-3 days or 4-6 days, or weeks, e.g. more than one week up to several months, e.g. more than 1 month, preferably more than 3 months. The above storage periods are relative to ambient conditions.

Examples of intrinsically conductive polymers according to the invention are those named at the beginning of this description. There can be named in particular as examples: polyaniline (PAni), polythiophene (PTh), poly(3,4-ethylenedioxythiophene) (PEDT), polydiacetylene, polyacetylene (PAc), polypyrrole (PPy), polyisothianaphthene (PITN), polyheteroarylenevinylene (PArV), wherein the heteroarylene group can be e.g. thiophene, furan or pyrrole, poly-p-phenylene (PpP), polyphenylene sulfide (PPS), polyperinaphthalene (PPN), polyphthalocyanin (PPc), among others, as well as their derivatives (which are formed e.g. from monomers substituted with side chains or groups), their copolymers and their physical mixtures. Polyaniline (PAni), polythiophene (PTh), poly(3,4-ethylenedioxythiophene) (PEDT), polythienothiophene (PTT) and their derivatives are particularly preferred. Polyaniline is most preferred.

In stage (a) of the process according to the invention, dispersible, intrinsically conductive polymer, preferably polyaniline, is in general prepared according to the directions given in EP-A-0 329 768. Reference is made in particular to the definitions used in EP-A-0 329 768. These also apply here in connection with the carrying out of stage (a) of the process according to the invention.

Preferably, the temperature in stage (a) of the process according to the invention, i.e. during the polymerization, is controlled such that not only does the temperature not rise during the polymerization above a value of more than 5° C. above the starting temperature, as required in EP-A-0 329 768, but also at no time during the polymerization is the rate of the temperature rise more than 1 K/minute. The reaction is preferably carried out such that the rise in temperature is <0.5° C., wherein the rate of the temperature rise is at no point more than 0.2° K./min.

The (intermediate) products obtained according to the invention according to stage (a) in general have a conductivity of approximately 5 S/cm.

The intermediate products from stage (a) are in general in the form of powder, wherein 80 wt.-% of the primary particles are smaller than 500 nm and wherein not more than 20 wt.-% of them are aggregated into aggregates of more than 1 µm. This can be seen from scanning electron microscope images of the dried solid and light-microscope examinations of dispersions in polymer blends.

The light-microscope examination takes place by dispersing the solid according to the invention directly or as concentrate in a test polymer with the help of an internal mixer. PCL or PVC are suitable as test polymers. The concentration of the substance to be dispersed is usually 0.5 wt.-%. The mixture is expressed into a thin film. In the case of raw materials according to the invention, a uniformly strongly coloured, semi-transparent substance is seen; the colouring is due to the dispersed primary particles. In addition, undispersed particles of 0.5-1 µm and also individual coarser particles can be seen in some cases.

After polymerization and working up—wherein it is not important whether the obtained polymer is already completely dry or not—in stage (b) of the process according to the invention the polymer is dispersed in the presence of a non-polymeric polar substance or triturated with same. The polar substance (which could also be called the "dispersion auxiliary") has the following properties:

it has a surface tension of more than 30 dyn/cm, it is not electrically conductive (i.e. it has an electric conductivity of less than $10^{-6}$ S/cm), it can be liquid or solid, it is inert vis-à-vis the conductive polymer used, i.e. no significant chemical reactions are associated with it; above all, oxidative or reductive and also acid-base reactions are not desired, under normal conditions, it is not necessarily a dispersion auxiliary and does not come under the substance class of the surfactants.

Examples of such polar substances are
a) solids: barium sulphate; titanium dioxide, in particular ultrafine titanium dioxide with a particle size of less than 300 nm; organic pigments such as Pigment Yellow 18;
b) inert solvents: water, DMF, DMSO, γ-butyrolactone, NMP and other pyrrolidone derivatives, dioxan, THF;

wherein this list is by way of example.

The dispersal or trituration with the polar substance can be carried out in general in dispersion devices such as high-speed mixers (e.g. so-called fluid mixers) or under ultrasound, in a ball mill, bead mill, a two-roll or three-roll mill or a high-pressure dispersion device (Microfluidics type).

In high-speed mixers or under ultrasound, the processing time is at least 3 minutes. In ball mills, on two- or three-roll mills or in other units with a high shearing force, a longer treatment time, e.g. of at least 30 minutes, is required. The simultaneous application of an electric field, in particular an electric alternating field with frequencies between 10 kHz and 10 GHz, can be advantageous; in this case, more than 24 hours are normally required.

The polar, non-conductive substance that is inert vis-à-vis the intrinsically conductive polymer is added in a quantity that results in a weight ratio of 2:1 to 1:10 between the conductive polymer powder and the polar substance.

Furthermore, at least one non-conductive polymer, in particular a thermoplastic polymer, is preferably present when carrying out stage (b). For example, polyethylene terephthalate copolymer, commercially available from Eastman Kodak or from Degussa, or a polymethyl methacrylate (PMMA) from Degussa, can be used. The presence of the thermoplastic polymer requires the dispersion to be carried out with high shear and at temperatures above 50° C., e.g. at temperatures between 50 and 200° C. or between 70 and 120° C., for example at say 90° C. After cooling, a solid mixture, a polymer blend that contains between 20 and 60 wt.-%, preferably approximately 35 wt.-% conductive polymer relative to the constituents solid at room temperature of the product composition from stage (b) is obtained which comprises the conductive polymer, the polar substance and optionally further non-conductive polymer. After carrying out stage (b), the conductive polymer generally has conductivities of say 60 S/cm.

After stage (b), the added polar, inert and non-conductive substance or the likewise present non-conductive polymer can be partly or almost completely removed by washing or extraction. This post-treatment step is preferably carried out after the conclusion of stage (b) as described in the above-mentioned paragraph. But alternatively, the post-treatment can also already start during stage (b).

The purpose of the post-treatment, which could also be called conditioning of the product from stage (b) for the subsequent dispersion stage (c), is to prepare (to condition) the product from stage (b) for the following dispersion stage (c). The most varied substances can be used for washing or extraction, e.g. aromatics, alcohols, esters, ethers, ketones, e.g. xylene, toluene, ethanol, isopropanol, chlorobenzene, diisopropyl ether and similar. Solvents and auxiliaries can also be added which support the subsequent dispersion stage (c). These can be e.g. xylene or chlorobenzene and also dodecylbenzenesulphonic acid (DBSH).

During the post-treatment of the product from stage (b), the proportion of the conductive polymer in the product, relative to the constituents solid at room temperature, is preferably increased by at least 5 wt.-%, preferably 10 wt.-%, in particular 20 wt.-%.

Alternatively, further processing can be carried out without reducing or removing the polar substance or the thermoplastic polymer, e.g. if the further processing and use of the conductive polymer is not disturbed by the presence of the added substance. The conductivity of the polymer powder is not adversely affected by the presence of the polar substance or of the thermoplastic polymer.

Preferred concentrations of conductive polymer which can be achieved after stage (b) and post-treatment are between 45 and 99 wt.-%, preferably 55 to 70 wt.-%, relative to the overall composition. For example, the product from stage (b) can be a moist paste with a relatively high proportion of solvent or auxiliary which was used in the post-treatment. Therefore it is not essential to the invention to very largely remove substances used during the post-treatment before carrying out stage (c) of the process according to the invention, but this may be advantageous in industrial practice.

Stage (c) of the process according to the invention is a dispersion that takes place in an organic or aqueous medium (dispersant) and is carried out in general at room temperature or at a temperature only slightly different from same. There come into consideration as dispersion aggregates in particular machines which are able to introduce high dispersion energy into the system. These can be e.g. systems such as Ultraturrax, Dissolver, bead mills, ball mills, high-pressure dispersion apparatuses such as those of the Microfluidics type, or ultrasound systems.

There are suitable as dispersants in particular solvents which have a surface tension of at least 25 mN/m. The dispersants according to the invention are liquid at room temperature and have in particular relative viscosities of <10,000, e.g. <5,000, and in particular <1,000.

Examples of dispersants according to the invention are xylene, chlorophenol, dichloroacetic acid, N-methylpyrrolidone, dimethyl sulphoxide, octanol, or benzyl alcohol or higher alcohols, e.g. paraffinic or aromatic $C_9$-$C_{20}$ alcohols or mixtures of same.

The dispersant or dispersants are added to the product from stage (b) of the process according to the invention in a quantity such that there is an excess (weight ratio) of dispersant relative to the intrinsically conductive polymer. In particular, the weight ratio of the conductive polymer to the dispersant is less than 1:10, preferably less than 1:15, e.g. 1:18.

In general, a high-viscosity paste or a liquid, low-viscosity dispersion with a concentration of the conductive polymer of in general not more than say 10 wt.-%, relative to the whole dispersion, is obtained as a product of stage (c). The dispersion obtained after stage (c) preferably contains small portions of the polar substances and non-conductive polymers used in stage (b), depending on the extent of the conditioning.

In preparation for the use of the dispersion according to the invention in the preparation of mouldings, self-supporting films or coatings with electric conductivity, auxiliaries and additives can be added after stage (c) or alternatively during stage (c). These can be e.g. viscosity regulators, wetting aids, matrix polymers such as varnish binders, film-forming substances, stabilizers, cross-linking auxiliaries, evaporation regulators such as evaporation accelerators or evaporation inhibitors or further auxiliaries and additives. A stable dispersion is then obtained which contains all the components that are helpful or decisive for the further shaping and the properties of the product.

The dispersion obtained after stage (c) including post-treatment and formulation can then, optionally after carrying out further dispersion and post-treatment steps, be used to prepare mouldings, self-supporting films or coatings of the most varied layer thickness with electric conductivity (shaping).

The shaping can be carried out by a series of processes, such as dipping, drip-wetting, spraying, spin-coating, printing (e.g. silk-screen printing, offset printing, ink-jet and others), extrusion, casting, doctor coating, electrospinning and others. Shaping by dipping, casting, drip-wetting, spin-coating or printing is particularly preferred.

The thus-obtained layers, coatings, films, sheets or other mouldings or components have a conductivity of >100 S/cm, preferably at least 200 S/cm, e.g. greater than 250 S/cm, in particular at least 500 S/cm, e.g. 200 to 200,000 S/cm, 200 to 20,000 S/cm or 500 to 10,000 S/cm, e.g. 300 to 3,000 or 500 to 1000 S/cm, after removal of the dispersants.

In addition, the particles of the dispersion according to the invention are characterized in that the X-ray diffractogram e.g. for polyaniline ("doped" with p-toluenesulphonic acid) has no sharp reflexes and at $2\theta$=ca 3° a reflex is visible which in the case of polyaniline from dispersions according to the invention has an at least equally high intensity compared with the broad reflection at $2\theta$=ca 19°. Compared with this, the "crude" powder from stage (a) normally does not display a peak there or only a very weak intensity, and although the polyaniline continues to display a clear reflection after the first trituration/dispersion process according to stage (b), this is weaker compared with the peak at approx. 19°.

After the second dispersion according to stage (c) and only for dispersions which are carried out according to the invention and accordingly allow a conductivity of >100 S/cm, this reflex unequivocally becomes most marked, and the other reflexes become increasingly weaker as conductivity increases.

As a result of the shaping or further processing, antistatic or conductive coatings, transparent and non-transparent electrodes, varnishes which are suitable for EMI shielding, contacts in electronics or "source", "drain" or "gate" in field effect transistors can be produced, likewise antennae, oscillating circuits, logical circuits, conductors or contrapoles in capacitors, electrolyte capacitors or so-called "supercapacitors" and perform many functions such as those which are performed in conventional electrical engineering and electronics by conventional metals, high-doped semiconductors of electrodes or redox-active layers.

The items which are accessible by drying or by carrying out one of the shaping processes described above and contain the conductive polymer obtainable from the dispersion according to the invention are an embodiment of the invention. The above-named items preferably substantially consist of the conductive polymer.

The following applications may be named by way of example:

as electric conductors (e.g. electric contact, electric leads, as pushbutton switches, electrodes etc.) or semiconductors, as protection against static charges, for shielding from electromagnetic waves (EMI shielding), for absorbing microwaves (for shielding or heating purposes), for manufacturing capacitors or as a replacement for electrolytes in electrolyte capacitors, as an electrode or electrode constituent in so-called "supercapacitors" (this type of capacitor is also called a double-layer capacitor (DLC) and is characterized by the formation of an electric double layer, often based on carbon black and/or graphite. They are often referred to as "electrochemical double layer capacitors".), for the manufacture of semiconductor elements such as diodes, transistors, among others, as photoconductors or in photovoltaic energy conversion, in compositions with metals or semimetals or in compositions with different conductive polymers exploiting the thermoelectric effect as temperature sensors (IR absorption) or in thermovoltaic energy conversion, as sensors, as indicators, e.g. by electrochromism, microwave absorption, thermoelectrical force etc., in electrolysis or electrosynthesis processes as electrocatalytic electrodes (e.g. in fuel cells), in photoelectrocatalysis or synthesis and in the case of photovoltaic effects, in corrosion protection, e.g. in the case of anodic corrosion protection, as electrodes in accumulators, as UV- and light-stable pigments, as electrodes or leads in electroluminescence systems (e.g.

as non-transparent so-called "back electrodes" or as transparent so-called "front electrodes"), as a hole injection layer or anodic buffer layer or as transparent anodes in organic/polymeric light diodes or solar cells.

The invention is to be explained in further detail with reference to the embodiment examples listed below.

EXAMPLES

Example 1

Stage (a)

The cooling required to control the temperature was maintained with cooling rates of at least 0.02 K/min, preferably 0.05 K/min. The cooling rates were determined by measuring the temperature change when cooling is activated at the reactors used in each case, without the reaction having been started. 300 ml aniline was polymerized by means of 960 g ammonium peroxodisulphate (dissolved in water) in the presence of 1960 g p-toluenesulphonic acid (pTs) in 9.5 l water to form polyaniline which is thus "doped" with pTs. The starting temperature of the reaction was 17.5° C. The reactants were added such that the temperature increased by no more than 5° C. and the rate of the temperature rise was less than 1 K/min. The precipitated crude polymer was filtered and washed three times with 10% aqueous pTs solution, filtration following in each case.

Yield: 210-330 g, conductivity (dried powder, cold-pressed) approx. 5 S/cm.

Example 2a

Stage (b)

In a high-speed laboratory mixer, polyaniline prepared as in Example 1 was dispersed for 3 minutes as dry powder with the substances used in the following table in the given ratio in each case.

| No. | Dispersion auxiliary | Ratio PAni:dispersion auxiliary | Conductivity S/cm |
|---|---|---|---|
| 2.1 | Butyrolactone | 1:0.5 | 30 |
| 2.2 | Butyrolactone | 1:1 | 40 |
| 2.3 | Butyrolactone | 1:2 | 65 |
| 2.4 | Paliotol Yellow K0961 | 3:1 | 25 |
| 2.5 | n-methyl-2-pyrrolidone | 3:1 | 30 |

Example 2b

Stage (b)

The powder obtained according to Example 1 was dispersed at 90° C. in the melt with PMMA in a laboratory kneader. A polyaniline concentration of approx. 40 wt.-% relative to the blend of polyaniline and polymethylene methacrylate was used.

After cooling, the polymer blend as a rule displays a conductivity of 60 (+/−20) S/cm.

Example 3

Post-Treatment/Conditioning 200 g of a predispersion from Example 2 was extracted with 1 l xylene in a fluidized-bed extraction unit. Approx. 400 g was obtained with a residual moisture content of 70 wt.-%.

Example 4

Stage (c)

200 g extraction residue from Example 3 was dispersed with 600 g xylene for 2.5 hours in a bead mill. A high-viscosity paste with a polyaniline content of approx. 4 wt.-% was obtained.

Example 5

Post-Treatment (Formulation) and Shaping 10 g paste from Example 4 was diluted with 10 g dichloroacetic acid and 10 g dichloromethane accompanied by stirring and applied to a glass substrate in a spin-coating unit with a speed of 1500 rpm. After drying, a layer thickness of 150 nm with a conductivity of 220 S/cm resulted.

Example 6

Post-Treatment/Conditioning 50 g of a predispersion from Example 2 was washed for 10 minutes with 300 ml chlorobenzene in a glass flask. The mixture was filtered. A moist residue with a solids content of 40 wt.-% and a calculated polyaniline concentration of approx. 0.15 wt.-% was obtained.

Example 7

Stage (c)

0.2 g filtration residue from Example 6 was mixed under ultrasound with 10 ml chlorophenol and exposed for 20 min to ultrasonic waves with an energy density of 500 $W/m^2$. A stable dispersion resulted.

Example 8

Post-Treatment (Formulation) and Shaping

The dispersion from Example 7 was diluted with 10 ml chlorophenol and 8 ml of this poured into a Petri dish. The dish was dried for 6 hours at a temperature of 50° C. A self-supporting film of 25 µm layer thickness and a conductivity of 540 S/cm resulted.

I claim:

1. A process for the preparation of a dispersion comprising the steps of:
   (a) preparing an intrinsically conductive polymer from monomers, wherein the temperature during the polymerization is controlled such that it does not exceed a value of more than 5° C. over the starting temperature,
   (b) triturating and/or dispersing the product from step (a) in the presence of a non-electrically conductive, non-polymeric polar substance which is inert vis-à-vis the conductive polymer, applying adequate shearing forces, wherein the weight ratio between the conductive polymer and the polar substance is 2:1 to 1:10, and
   (c) dispersing the product from step (b) in a dispersant, wherein the weight ratio between the conductive polymer and the dispersant is less than 1:10 and wherein the resulting dispersion contains particles of at least one intrinsically conductive polymer, wherein the particle size is on average (weight) less than 1 µm, characterized in that the dispersant is a liquid at room temperature, and a layer, film or sheet formed from this dispersion has a conductivity of >100 S/cm after removal of the dispersant.

2. The process according to claim 1, characterized in that at no time during the polymerization is the rate of the temperature rise during step (a) more than 1 K/minute.

3. The process according to claim 2, characterized in that in step (b) furthermore at least one non-conductive polymer is present.

4. The process according to claim 1, characterized in that the non-conductive polymer is a thermoplastic polymer.

5. The process according to claim 1, characterized in that the product from step (b) is subjected to a post-treatment.

6. The process according to claim 5, characterized in that the portion of the polar substance or of the non-conductive polymer in the product from step (b) is reduced during the post-treatment by washing or extraction.

7. The process according to claim 1, characterized in that solvents and/or auxiliaries are added which support the subsequent dispersion step (c).

8. The process according to claim 1, characterized in that the product from step (c) is subjected to a post-treatment.

9. The process according to claim 1, characterized in that viscosity regulators, wetting aids, matrix polymers, stabilizers, cross-linking auxiliaries, evaporation regulators and/or other auxiliaries and additives which support an optionally following shaping process are added.

10. The process according to claim 9, characterized in that the addition takes place before or during step (c).

11. The process according to claim 1, characterized in that during the post-treatment of the product of step (b) and/or during dispersion step (c) an organic solvent is used which has a surface tension of more than 25 mN/in.

12. The process according to claim 5, characterized in that the concentration of the conductive polymer increases during the post-treatment of the product from step (b) by at least 5 wt.-%, relative to the constituents solid at room temperature.

13. The process according to claim 1, characterized in that the dispersion step(s) is or are carried out in a dispersion device selected from the grouping consisting of a ball mill, a bead mill, a three-roll mill and a high-pressure dispersion device.

14. The process according to claim 1, characterized in that the dispersion is carried out under ultrasound.

15. The use of a dispersion prepared according to the process of claim 1 for the preparation of mouldings, self-supporting films or coatings with electric conductivity.

16. The use according to claim 15 characterized in that the mouldings, self-supporting films or coatings are electrodes, antennae, polymeric electronics components, capacitors and double-layer capacitors (DLC).

* * * * *

UNITED STATES PATENT AND TRADEMARK OFFICE
CERTIFICATE OF CORRECTION

PATENT NO. : 7,683,124 B2 Page 1 of 1
APPLICATION NO. : 10/597170
DATED : March 23, 2010
INVENTOR(S) : Bernhard Wessling It is certified that error appears in the above-identified patent and that said Letters Patent is hereby corrected as shown below:

Column 10, Claim 4, Line 52, please delete "claim 1" and insert --claim 3--.

Signed and Sealed this

Eighteenth Day of May, 2010

David J. Kappos
*Director of the United States Patent and Trademark Office*